(12) United States Patent
Makita

(10) Patent No.: US 6,775,837 B1
(45) Date of Patent: Aug. 10, 2004

(54) HEAD LIFTING DEVICE AND DISK APPARATUS INCORPORATING THE SAME

(75) Inventor: Akihiko Makita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 356 days.

(21) Appl. No.: 09/717,994

(22) Filed: Nov. 21, 2000

(30) Foreign Application Priority Data

Dec. 28, 1999 (JP) ............................................ 11-375253

(51) Int. Cl.$^7$ .............................................. G11B 7/08
(52) U.S. Cl. ..................................................... 720/690
(58) Field of Search .............................. 369/244, 244.1, 369/244.2, 244.3, 75.1, 75.2, 270

(56) References Cited

U.S. PATENT DOCUMENTS

| | | | |
|---|---|---|---|
| 4,605,979 A | * 8/1986 | Inoue et al. | 360/254.3 |
| 4,724,500 A | * 2/1988 | Dalziel | 360/245.7 |
| 4,788,676 A | * 11/1988 | Dennis | 369/176 |
| 4,858,278 A | * 8/1989 | Pinto et al. | 19/200 |
| 5,006,946 A | * 4/1991 | Matsuzaki | 360/245.9 |
| 5,467,338 A | * 11/1995 | Song | 369/270 |
| 5,500,838 A | 3/1996 | Matsumoto et al. | |
| 5,590,095 A | * 12/1996 | Chaya | 369/13.17 |
| 5,860,206 A | * 1/1999 | Tochiyama | 29/603.04 |
| 5,870,252 A | * 2/1999 | Hanrahan | 360/244.8 |
| 5,943,312 A | * 8/1999 | Takahashi et al. | 369/244 |
| 6,313,971 B1 | * 11/2001 | Takagi et al. | 360/245.2 |

FOREIGN PATENT DOCUMENTS

| | | |
|---|---|---|
| JP | 02173960 A | 7/1990 |
| JP | 06-020326 | 1/1994 |
| JP | 07192418 A | 7/1995 |

* cited by examiner

Primary Examiner—David Davis
(74) Attorney, Agent, or Firm—Greer, Burns & Crain, Ltd.

(57) ABSTRACT

A head lifting device includes a head-supporting member, a magnetic or optical head supported by the head-supporting arm and a base member for supporting the head-supporting arm. This arm is formed with at least one hole, while the base member is provided with a protrusion coming into contact with the inner wall of the hole. The head-supporting arm and the base member are held together by an elastic clip, with the protrusion held in sliding engagement with the hole.

21 Claims, 18 Drawing Sheets

HEAD LIFTING DEVICE AND DISK APPARATUS INCORPORATING THE SAME

BACKGROUND OF THE INVENTION

1. Field of the Invention

The present invention relates to a head lifting device for moving a magnetic or optical head toward and away from a data-recording disk such as a magnetic disk, optical disk, MO (magneto-optical) disk. It also relates to a disk apparatus incorporating such a head lifting device.

2. Description of the Related Art

Conventional head lifting devices are disclosed in JP-A-6(1994)-20326, U.S. Pat. No. 5,500,838, JP-B2-8(1996)-31264 and JP-B2-8(1996)-10499 for example. Among these, the first three documents disclose similar head lifting mechanisms, in which a head-supporting arm is caused to pivot about a predetermined axis. The last document discloses a different type of mechanism from those disclosed in the first three documents.

Specifically, FIG. 23 of the accompanying drawings shows the principal components of a magneto-optical disk apparatus disclosed in JP-A-6(1994)-20326. As seen from the figure, the conventional disk apparatus includes a magnetic head 90 and a head-supporting arm 91. The magnetic head 90 is attached to the free end of the arm 91. The opposite end or base end of the arm 91 is formed with a through-hole 92 into which a horizontal pin 93 is inserted. Thus, as shown in the figure, the arm 91 is vertically pivotable about the pin 93, thereby moving the head 90 toward or away from the MO disk D. When the magnetic head 90 is held the uppermost position, the MO disk D is easily loaded into or unloaded from the disk apparatus. To perform data-writing or data-reading with the MO disk D, the arm 91 is caused to pivot to the lowermost position, so that the head 90 is held adjacent to the disk D.

FIGS. 24A and 24B show the principal components of a magneto-optical disk apparatus disclosed in JP-B2-8(1996)-10499. As shown in FIG. 24A, the conventional disk apparatus includes a horizontally movable frame 94 and an elastic head-supporting arm 95 attached to the upper part of the frame 94. The downwardly diagonal arm 95 carries a magnetic head 90 at its lower end, to position the head 90 adjacent to the MO disk D. The conventional disk apparatus is also provided with a stationary pin 96 protruding horizontally under the upper part of the frame 94. The position of the pin 96 is adjusted so that it comes into contact with the arm 95 when the frame 94 is moved in the Na-direction shown in FIG. 24B. Thus, as the frame 94 is moved in the Na-direction, the elastic arm 95 will bump into the pin 96 and consequently be flattened, as shown in the figure. As a result of this, the magnetic head 90, attached to the lower end of the arm 95, will be brought away from the MO disk D.

The above-described conventional disk apparatuses have been found disadvantageous in the following points.

In the first type of conventional apparatus shown in FIG. 23, it is necessary to provide some play between the pin 93 and the through-hole 92 for allowing smooth pivotal movement of the arm 91. Due to this play, however, the positioning of the head 90 relative to the recording surface of the disk D tends to become inaccurate. To address this problem, the conventional apparatus is provided with an upright positioning pin 98 to engage with an elongated opening 97 formed in the arm 97. Here again, some play needs to be provided between the pin 98 and the opening 97, whereby the problem of inaccurate positioning of the head 90 will remain unsolved.

In the second type of conventional apparatus shown in FIGS. 24A and 24B, the above-described inaccurate positioning of the head will not be a problem. Disadvantageously, however, the head-supporting arm 95 may lose its initial elasticity after it has been repeatedly deformed through contact with the pin 96. Since this problem is apt to be exacerbated as the arm 95 is bent to a greater extent, the movable range of the magnetic head 90 cannot be made large enough to facilitate the loading and unloading of the Disk D.

SUMMARY OF THE INVENTION

The present invention has been proposed under the above-described circumstances, and its object is to provide a simple structure which allows a read/write head to move a great distance (or stroke) relative to a data storage disk without compromising the accuracy of head positioning procedure.

According to a first aspect of the present invention, there is provided a head lifting device includes: a head-supporting member including a first end and a second end opposite to the first end; a head element supported by the first end of the head-supporting member; a base member for supporting the second end of the head-supporting member; and connecting means for pivotably connecting the base member to the second end of the head-supporting member. The connecting means includes at least one hole and at least one protrusion held in sliding engagement with the hole. The protrusion as a whole is prevented from passing through the hole.

With such an arrangement, no play will be provided between the protrusion and the hole. Thus, it is possible to accurately perform the positioning of the head element (carried by the head-supporting member) relative to e.g. a data storage disk. When such accurate positioning is possible, a magnetic head (an example of the claimed head element) can be made appropriately small, since there is no need to generate an unduly strong magnetic field to compensate for the otherwise inaccurate head positioning operation. Further, in such an instance, the coil inductance of the magnetic head can be made smaller, which is advantageous to improving the data transfer speed.

The head element may be an optical head other than a magnetic head.

According to a preferred embodiment of the present invention, the hole may be formed in the head-supporting member, while the protrusion may be formed on the base member. Alternatively, the hole may be formed in the base member, while the protrusion may be formed on the head-supporting member.

Preferably, the protrusion may include a spherical portion engaging with the hole. In this manner, the head-supporting member can pivot smoothly on the protrusion.

Preferably, the hole may have a circular or triangular configuration.

According to another preferred embodiment of the present invention, the protrusion may include a non-spherical portion. For instance, the protrusion may be a prism or pyramid. Here, the "pyramid" is defined as a solid or hollow shape with a square or triangular base and sloping sides that meet in a point at the top. Of course, the protrusion may have other configurations.

According to another preferred embodiment of the present invention, the connecting means may include first and second protrusions spaced from each other in a direction perpendicular to a line connecting the first and the second ends of the head-supporting member. The first and the second protrusions may be engaged with a single hole of the connecting means.

According to still another preferred embodiment of the present invention, the connecting means may be provided with first and second holes engaging with the first and the second protrusions, respectively.

According to still another preferred embodiment of the present invention, the hole and the protrusion may be elongated in a direction perpendicular to a line connecting the first and the second ends of the head-supporting member.

The protrusion may be formed separately from the head-supporting member and the base member. Alternatively, the protrusion may be formed integral with either one of the head-supporting member and the base member.

The protrusion may be made up of a solid metal ball used in e.g. a ball bearing. Instead of having a completely round figure, the protrusion may include a flat surface to be adhered to either one of the head-supporting member and the base member.

Preferably, the base member may be provided with a stopper to abut against a particular portion of the head-supporting member for facilitating the positioning of the head element.

Preferably, the head lifting device of the present invention may further comprise urging means to urge the head-supporting member toward the base member for keeping the hole in pressing contact with the protrusion.

Specifically, the urging means may be provided with first and second spring pieces pressing against first and second portions of the head-supporting member, respectively. The first and the second portions may preferably be spaced from each other in a direction connecting the first and the second ends of the head-supporting member.

Preferably, the head lifting device of the present invention may further comprise a movable lifting plate formed with an elongated opening. Accordingly, the head-supporting member may be provided with a post held in sliding engagement with the elongated opening. The post may be provided with an enlarged head portion, so that it is prevented from accidentally coming off the elongated opening.

According to a second aspect of the present invention, there is provided a disk apparatus including: a spindle on which a data storage disk is mounted; a head element brought into facing relation to the disk; a head-supporting member for supporting the head element; a base member for supporting the head-supporting member; and connecting means for pivotably connecting the base member to the head-supporting member. The connecting means may include at least one hole and at least one protrusion held in sliding engagement with the hole, wherein the protrusion as a whole is prevented from passing through the hole.

Preferably, the disk apparatus of the present invention may further include a lifting plate provided with a presser member to press the disk onto the spindle.

Other features and advantages of the present invention will become apparent from the detailed description given below with reference to the accompanying drawings.

DETAILED DESCRIPTION OF THE PREFERRED EMBODIMENTS

The preferred embodiments of the present invention will be described below with reference to the accompanying drawings.

Figure 1:
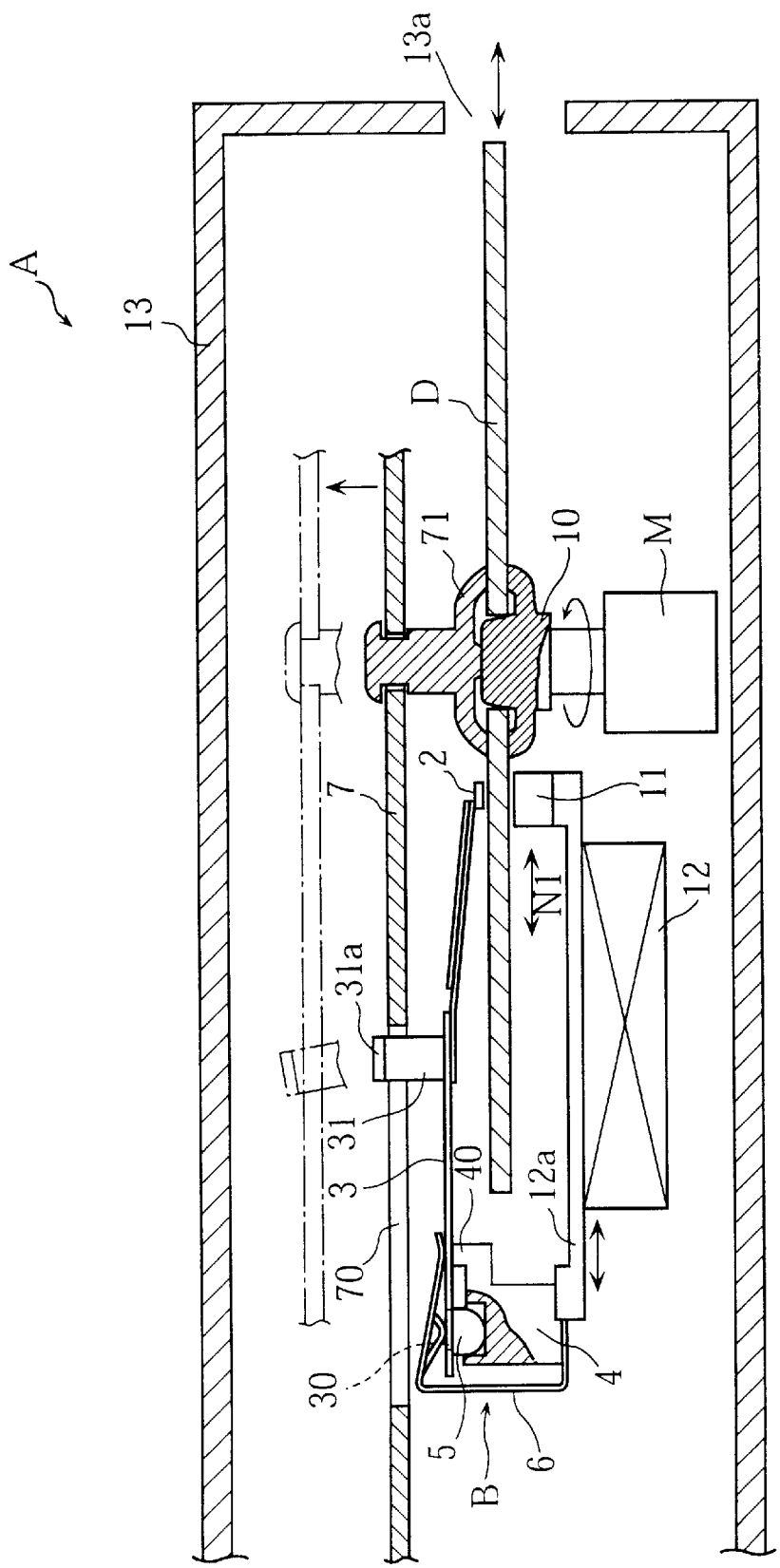
FIG. 1 is a sectional side view showing the principal components of a disk apparatus embodying the present invention.

FIGS. 1–7 show a magneto-optical disk apparatus incorporating a head lifting device embodying the present invention. As shown in FIG. 1, the disk apparatus A of the present invention includes a spindle 10 connected to a drive motor M, an optical head 11, a seek mechanism 12, a magnetic head 2 and a head lifting device B. These components are accommodated in a housing 13 formed with an opening 13a.

A magneto-optical (MO) disk D is set (loaded) into or taken away (unloaded) from the disk apparatus A through the opening 13a. The disk D when loaded is clamped between a presser member 71 and the spindle 10. When the motor M is turned on, the disk D will be rotated at high speed about a vertical axis of the spindle 10. The MO disk D may simply be entirely exposed to the exterior, or it may be housed in a protection cartridge.

The opening 13a of the housing 13 is fixed in size, though the present invention is not limited to this. For facilitating the loading and unloading of the disk D, the size of the opening 13a may be variable.

The optical head 11 is arranged below the disk D for conducting a laser beam to the recording layer of the disk D in performing data-writing or data-reading. To form a proper laser spot on the recording layer of the disk D, the optical head 11 is provided with a focusing lens (not shown) for the laser beams emitted from a non-illustrated light source.

The seek mechanism 12 moves the optical head 11 horizontally, as shown by a two-headed arrow N1 in FIG. 1, so that the optical head 11 will be brought into proper facing relation to the desired tracks on the disk D. The seek mechanism 12 may be designed to move the head 11 linearly toward or away from the center of the disk D. Alternatively, the head 11 may be moved along an arcuate curve.

The head lifting device B includes a pivotable plate 3 to support the magnetic head 2, a base block 4 to support the plate 3, two protrusions or stubs 5, a clip 6 and a lifting plate 7.

Figure 2:
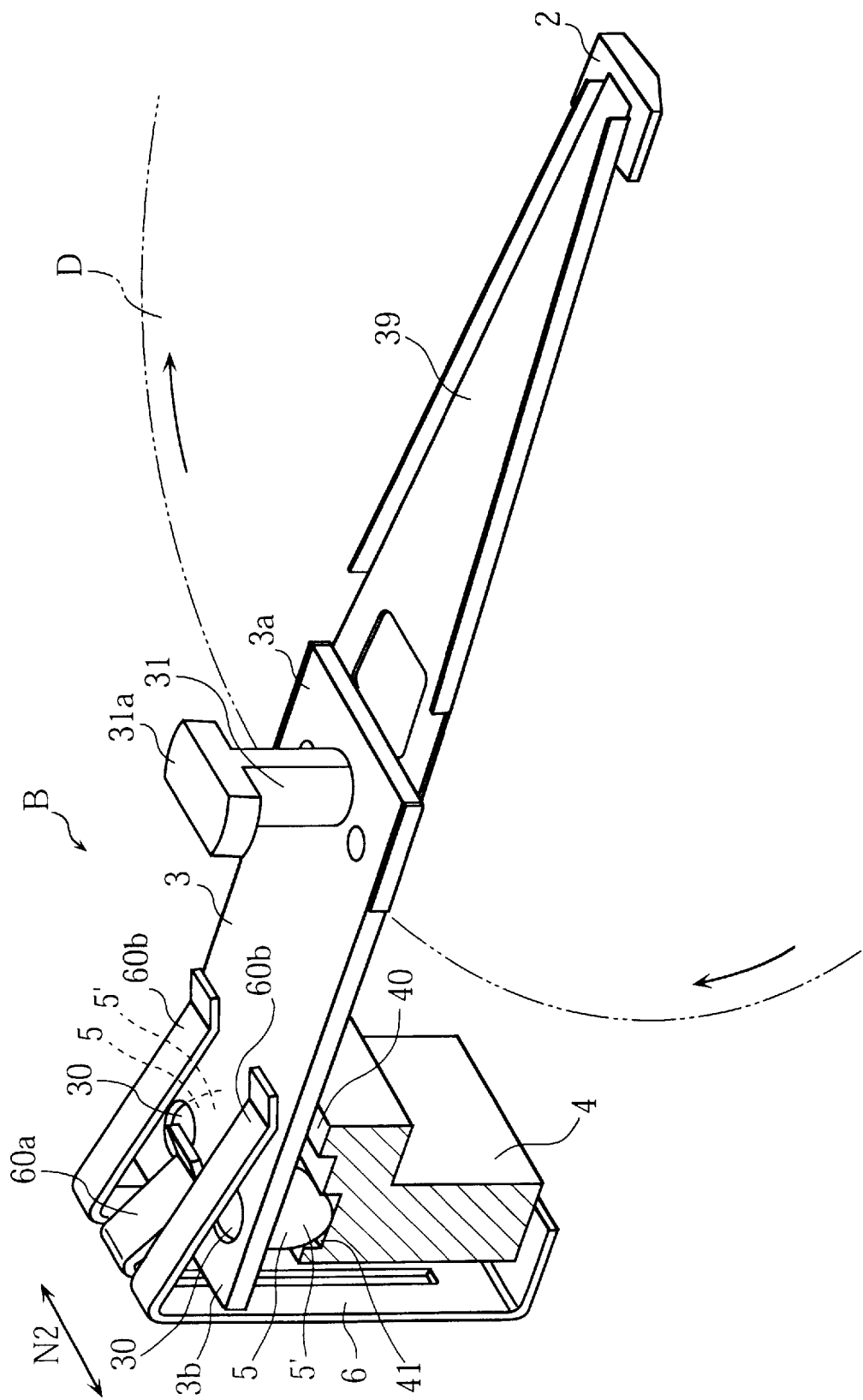
FIG. 2 is a perspective view showing ahead lifting device incorporated in the disk apparatus of FIG. 1.

The magnetic head 2 incorporates a coil (not shown) for generating a magnetic field needed to cause the optical head 11 to write or read data to or from the disk D. As shown in FIG. 2, the magnetic head 2 is directly supported by a suspension 39 which in turn is attached to the inner end 3a of the head-supporting plate 3. The suspension 39, which may be made of a leaf spring, is elastically deformable in the vertical direction. When the disk D is being rotated at high speed, the magnetic head 2 will float over the surface of the disk D due to the air introduced between the head 2 and the disk D.

The base block 4, which may be made of a synthetic resin, supports the head-supporting plate 3. As shown in FIG. 1, the block 4 is mounted on a base plate 12a which is moved horizontally by the seek mechanism 12. Thus, upon actuation of the seek mechanism 12, both the optical head 11 and the magnetic head 2 will be moved horizontally the same distance in the same direction, so that they maintain the initial facing relation (with the disk D intervening therebetween). The base block 4 is provided at its upper portion with an upright stopper 40 to abut against the lower surface of the head-supporting plate 3.

Figure 3:
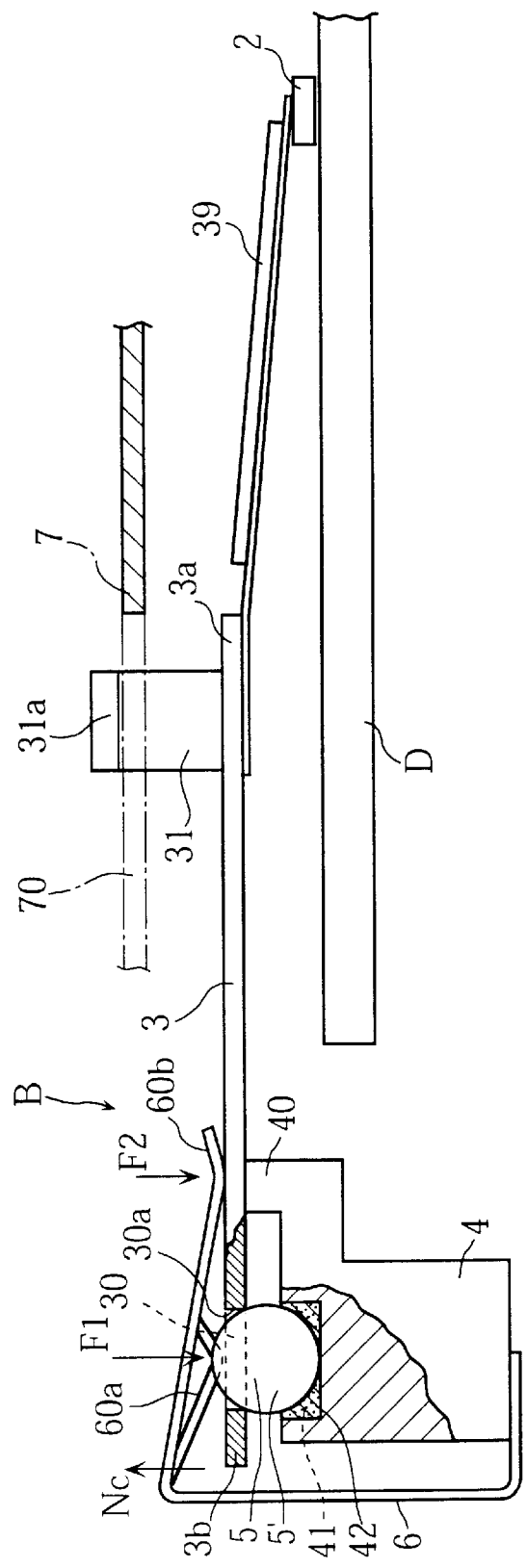
FIG. 3 is a side view showing, partially in section, the head lifting device of FIG. 2.

The paired protrusions 5 are fixed to the upper portion of the supporting block 4. As shown in FIG. 1 for example, the protrusions 5 are located radially outward of the disk D from the stopper 40. As seen from FIG. 2, the two protrusions 5 are spaced from each other in the widthwise direction of the plate 3 (see the two-headed arrow N2). As best shown in FIG. 3, each protrusion 5 is a solid ball 5' arranged in an upwardly open recess 41 formed in the block 4 (see also FIG. 7). The lower part of the ball 5' is secured to the recess 41 by adhesive 42. The ball 5' may preferably be a metal ball used in a ball bearing, since generally a bearing ball is obtainable at low price, and has an ideally round figure, high hardness and excellent wear resistance.

The head-supporting plate 3, made of a synthetic resin or metal or a composite of these, is formed at its outer end (base end) 3b with a pair of round holes 30. As shown in FIG. 2, these holes are spaced from each other in the widthwise direction of the plate 3. As seen from FIGS. 2 and 3, the plate 3 is mounted on the base block 4 so that it extends in a radial direction of the disk D, with the holes 30 held in engagement with the protrusions 5, respectively. As shown in FIG. 3, the diameter of each hole 30 is smaller than that of the protrusion 5, whereby the inner wall 30a of the hole 30 is caught on the surface of the protrusion 5. The head-supporting plate 3 is formed at its inner end 3a with a generally T-shaped post 31 (see FIG. 2). The purpose of the post 31 will be described later.

The clip 6, which may be made by pressing a thin metal plate, is designed to clamp the plate 3 and the block 4 in their thickness direction. As best shown in FIG. 2, the clip 6 is provided with a relatively short spring piece 60a and a pair of relatively long spring pieces 60b, to urge the head-supporting plate 3 downward. The short spring piece 60a presses on a portion of the plate 3 between the two holes 30, while the long spring pieces 60b press on an inner portion (as viewed from the paired holes) of the plate 3 which is located right above the stopper 40 of the supporting block 4 (see also FIG. 3). Due to the clamping force of the clip 6, the holes 30 of the plate 3 and the protrusions 5 are kept in proper engaging relation while the plate 3 is pivoting on the protrusions 5.

As shown in FIG. 1, the lifting plate 7 is arranged above the loaded disk D. The lifting plate 7 will be moved upward and downward by a non-illustrated driving mechanism provided in the housing 13. This driving mechanism may be directly connected to the lifting plate 7. Alternatively, the driving mechanism may be connected to a movable part of the housing 13 to which the lifting plate 7 is also connected. As illustrated, the lifting plate 7 is provided with a presser member 71 for fixing the disk D at its center to the spindle 10.

Figure 4:
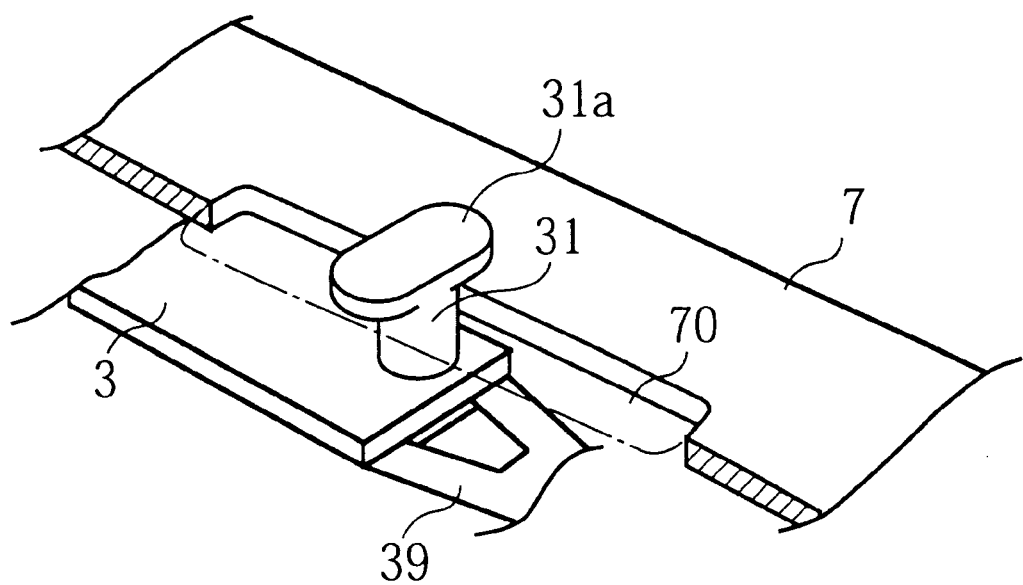
FIG. 4 is a perspective view illustrating the engaging relation between the head-supporting plate (lower) and the lifting plate (upper) shown in FIG. 3.

As best shown in FIG. 4, the lifting plate 7 is formed with an elongated slit 70 extending longitudinally of the plate 3. The T-shaped post 31 of the plate 3 is inserted into the slit 70 in a reciprocative manner. The post 31 is provided with an enlarged head portion 31a whose width is greater than that of the slit 70. Thus, the post 31 is retained in the slit 70 when a downward pulling force is exerted on the post 31.

Figure 8:
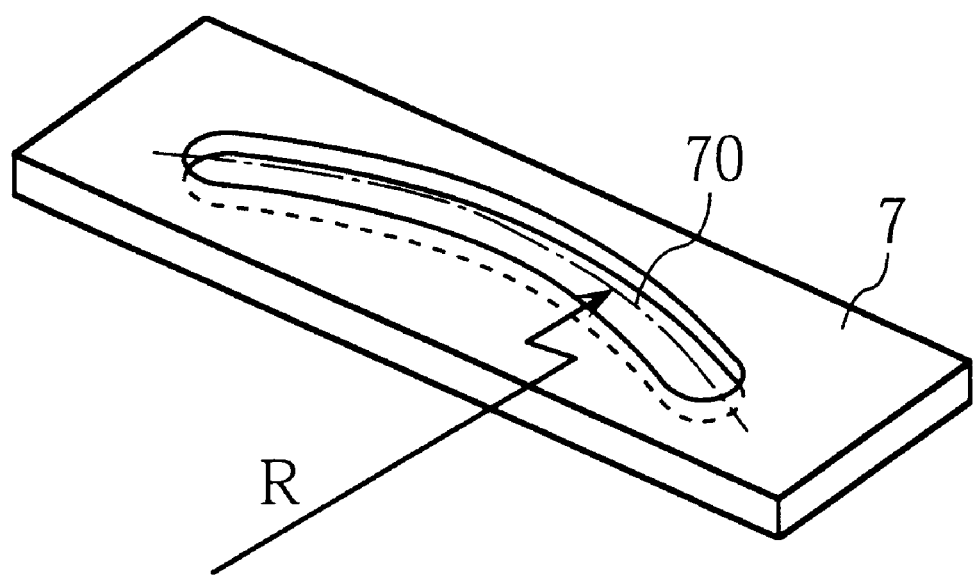
FIG. 8 is a perspective view showing the lifting plate formed with an arcuate slit.

The slit 70 shown in FIG. 4 is rendered straight on the premise that the track-seeking operation of the heads 2 and 11 is to be performed linearly. However, if the seeking operation is performed in an arc, the slit 70 is formed into an arc having a curvature of radius R, as shown in FIG. 8.

Next, the operation of the head lifting device B and disk apparatus A will be described.

Figure 5:
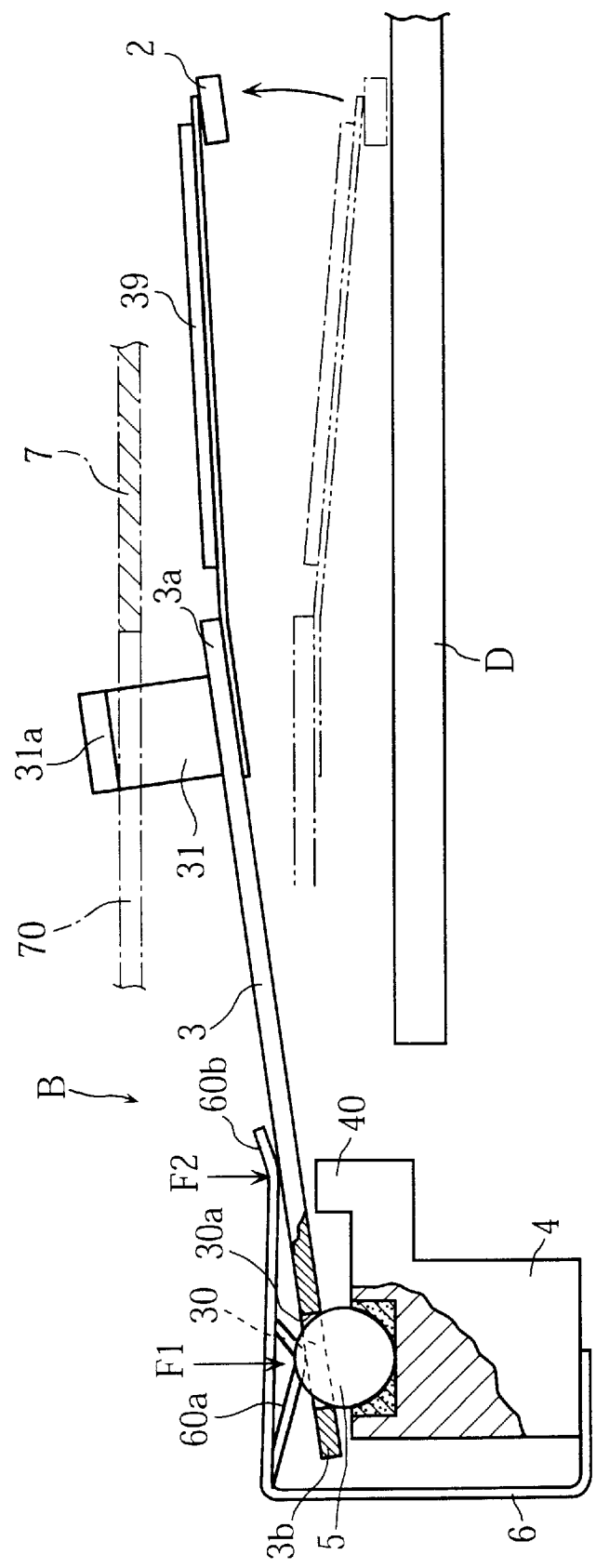
FIG. 5 is a side view showing, partially in section, a condition in which the magnetic head is raised away from the disk D.

For securing the disk D to the spindle 10, the lifting plate 7 is lowered, causing the presser member 71 to press the center of the disk D onto the spindle 10, as shown in FIG. 1. For unloading the disk D, on the other hand, the lifting plate 7 is raised, thereby causing the presser member 71 to come out of engagement with the disk D. Upon raising the lifting plate 7, the upright post 31 engaged with the plate 7 is also raised. As a result, the head-supporting plate 3 is caused to pivot upward or counter clockwise as shown in FIG. 5. At this time, the plate 3 may be raised above the stopper 40 of the supporting block 4 against the pressing force F2 of the longer spring pieces 60b. On the contrary, the holes 30 are kept in engagement with the protrusions 5 during this pivoting movement due to the downward force F1 of the shorter sprint piece 60a of the clip 6.

When the lifting plate 7 is lowered, the head-supporting plate 3 is caused to pivot downward accordingly, to bring the head 2 into the original facing relation to the disk D.

According to the above embodiment, the magnetic head 2 is supported by the suspension 39 which is attached to the head-supporting plate 3. Consequently, the distance between the magnetic head 2 and the pivot center of the plate 3 is rendered appropriately long. Thus, the magnetic head 2 will be moved a sufficiently great distance away from the disk D even when the pivot angle of the plate 3 is small. This arrangement is advantageous in that the loading or unloading of the disk D is easily performed without worrying about the interference of the disk D with the head 2.

In the above embodiment, the presser member 71 is attached to the movable lifting plate 7. Thus, there is no need to provide an additional driving mechanism used exclusively for moving the presser member 71 to positionally fix or release the disk D.

Figure 6:
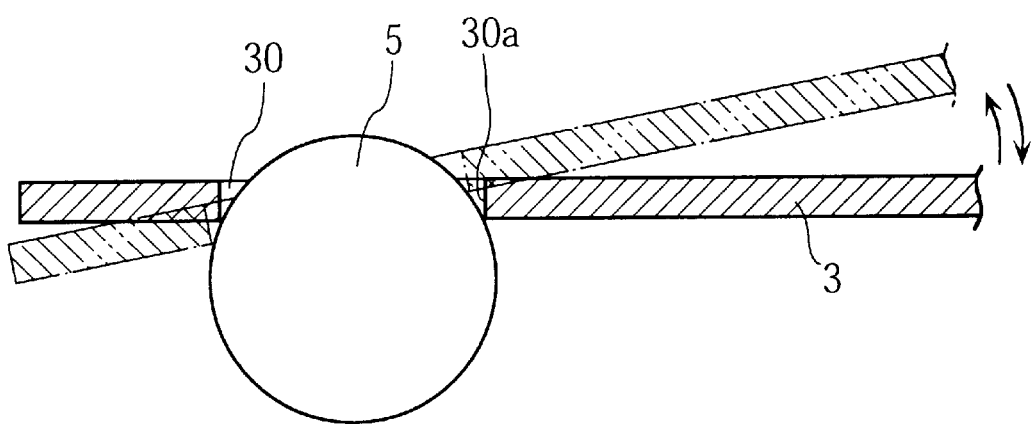
FIG. 6 illustrates how the head-supporting plate pivots on a round protrusion.

Referring to FIG. 6, when the head-supporting plate 3 pivots vertically, the inner wall 30a of each hole 30 slides over the spherical surface of the protrusion 5. These inner wall 30a and protrusions 5 serve to guide the plate 3 in motion. In this connection, it should be noted that the plate 3 is guided by the two protrusions 5 spaced in the widthwise direction of the plate 3. Thus, the pivoting of the plate 3 can always be performed in the same stable manner, without being displaced longitudinally or widthwise of the plate 3. Accordingly, the magnetic head 2 once raised above the disk D will be returned to the initial disk-facing position.

When the magnetic head 2 is lowered toward the disk D, as shown in FIG. 3, the stopper 40 of the base block 4 abuts against the lower surface of the head-supporting plate 3. This arrangement is advantageous to preventing the head 2 from coming too close to the disk D.

According to the illustrated embodiment, the head-supporting plate 3 is supported at three separate points (two protrusions 5 and one stopper 40) when it takes the non-pivoting position shown in FIG. 3. Consequently, the plate 3 is stably supported by the base block 4, which is advantageous to maintaining the magnetic head 2 at the right position relative to the disk D.

In this connection, it should be noted that the head-supporting plate 3 held in the non-pivoting position (FIG. 3) receives a clockwise rotating force, since the distance between the head 2 and the stopper 40 is much greater than the distance between the stopper 40 and the extremity of the base end 3b of the plate 3. Therefore, without taking any countermeasures, the base end 3b of the plate 3 would be moved upward, as indicated by an arrow Nc in FIG. 3. According to the illustrated embodiment, however, this upward movement is restricted by the pressing force F1 of the shorter spring piece 60a, so that the plate 3 remains stationary on the base block 4. It should be noted here that the downward pressing force F2 of the longer spring pieces 60b acts on the portion of the plate 3 located right above the stopper 40. Therefore, this pressing force F2 does not work as a rotating force for the plate 3.

In the illustrated head lifting device B, the spherical protrusions 5 are prepared separately from the supporting block 4 and then adhered to the block. Specifically, the fixing of the protrusions 5 may be performed in the following manner.

Figure 7:
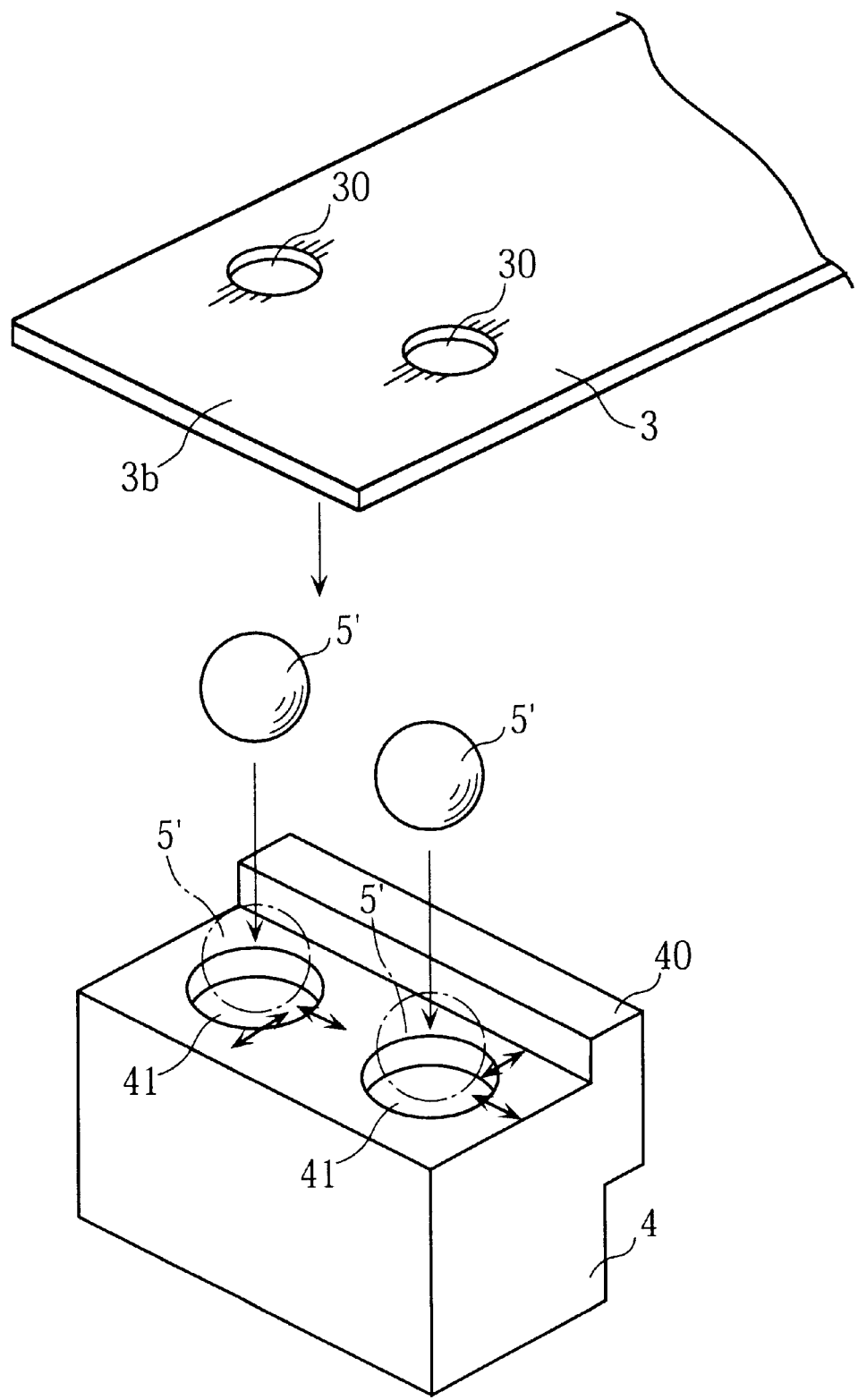
FIG. 7 is an exploded view illustrating how the head-supporting plate is adjusted in position relative to the supporting block.

First, referring to FIG. 7, each of the solid balls 5' is placed in the recess 41 of the block 4. At this stage, no adhesive is applied to the balls 5' and/or the recesses 41. Then, the head-supporting plate 3 is mounted on the block 4 in a manner such that the two holes 30 come into engagement with a respective one of the two balls 5'. Then, the plate 3 is adjusted in posture relative to the block 4, with the balls 5' properly held in the holes 30. During this postural adjustment, each of the balls 5' may be shifted within the recess 41 in the longitudinal and/or widthwise directions of the plate 3, as shown in the figure. After the adjustment is completed, adhesive is applied to positionally secure the balls 5' in the respective recesses 41. In this manner, the magnetic head 2, which is supported by the plate 3 via the suspension 39, can be brought into accurate facing relation to the optical head 11.

Figure 9A:
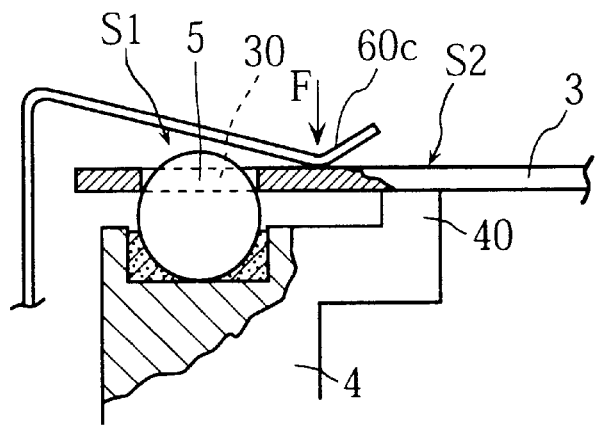
FIGS. 9A–9C are side views showing, partially in section, how the head-supporting plate is urged toward the supporting block.
Figure 9B:
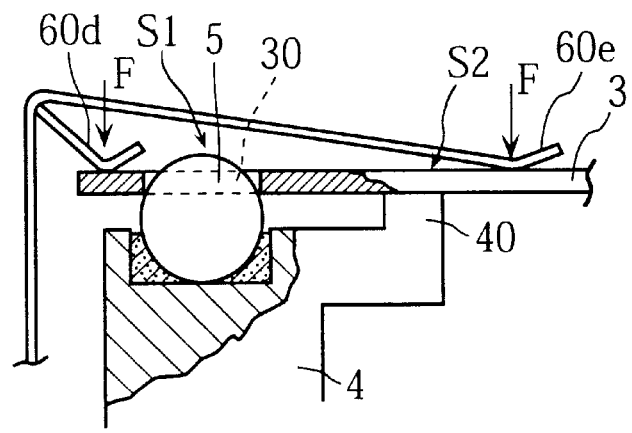
Figure 9C:
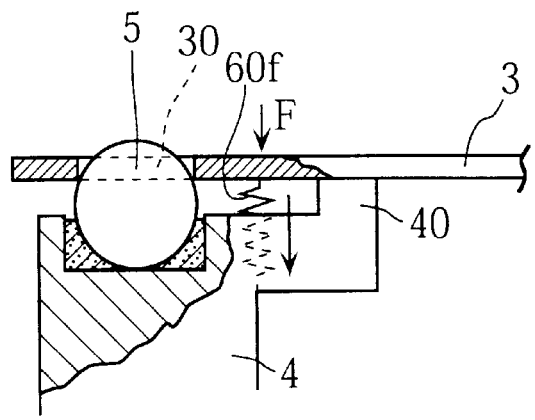

FIGS. 9A–9C show other possible ways to urge the head-supporting plate 3 onto the protrusions 5 and the stopper 40. Specifically, in the first example of FIG. 9A, only a single spring piece 60c is used for pressing the plate 3 downward. As illustrated, the spring force F is exerted on a part of the plate 3 located between a first point S1 (at which the holes 30 engage with the protrusions 5) and a second point S2 (at which the plate 3 engages with the stopper 40). In the second example of FIG. 9B, use is made of two spring pieces 60e and 60e for pressing the plate 3. The first spring piece 60e engages with a part of the plate 3 located on the left side of the first point S1, while the second spring piece 60e engages with a part of the plate 3 located on the right side of the second point S2. In the third example of FIG. 9C, use is made of a coil spring 60f connected at one end to the plate 3 and at the other end to the supporting block 4.

Figure 10A:
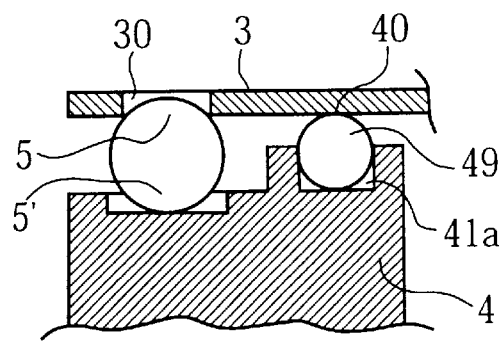
FIGS. 10A and 10B illustrate a different structure for mounting the head-supporting plate on the supporting block.
Figure 10B:
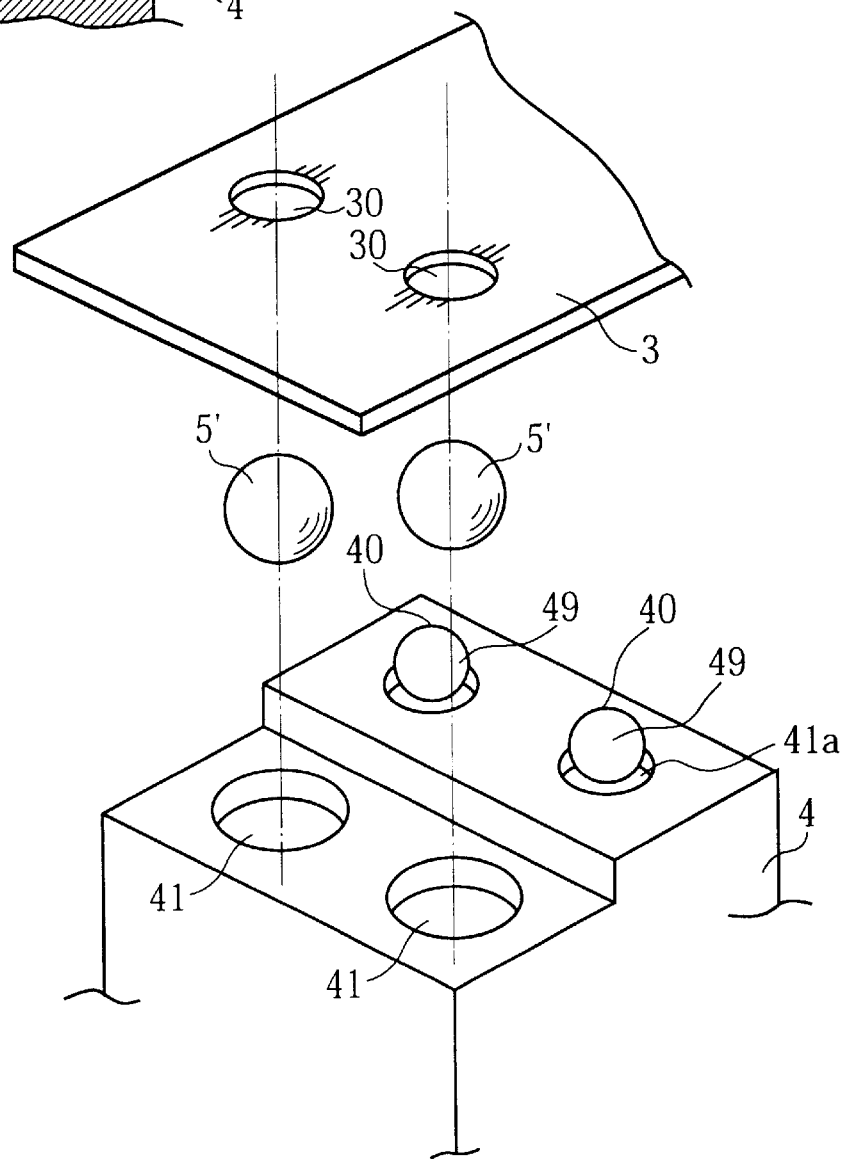

FIGS. 10A and 10b show a different structure for supporting the plate 3 on the block 4. In this example, an additional pair of protrusions 49 are used together with the primary protrusions 5. The additional protrusions 49 are provided by two identical solid balls 40 fitted in a respective one of two recesses 41a formed in the upper part of the supporting block 4. As shown in FIG. 10A, the additional protrusions 49, which are smaller in diameter than the primary protrusions 5, serve as a stopper to abut on the lower surface of the plate 3. It should be noted here that a point-to-surface type of contact is established between the additional protrusions 49 and the lower surface of the plate 3. Thus, as compared with the surface-to-surface type of contact between the plate 3 and the stopper 40 (see FIG. 3), the plate 3 shown in FIG. 10A can be moved on the protrusions 49 more smoothly in performing the initial positioning of the plate 3 relative to the supporting block 4 (previously described with reference to FIG. 7). The number of additional protrusions 49 may be arbitrary. Thus, more than two protrusions or only one protrusion may be used for supporting the plate 3.

Figure 11:
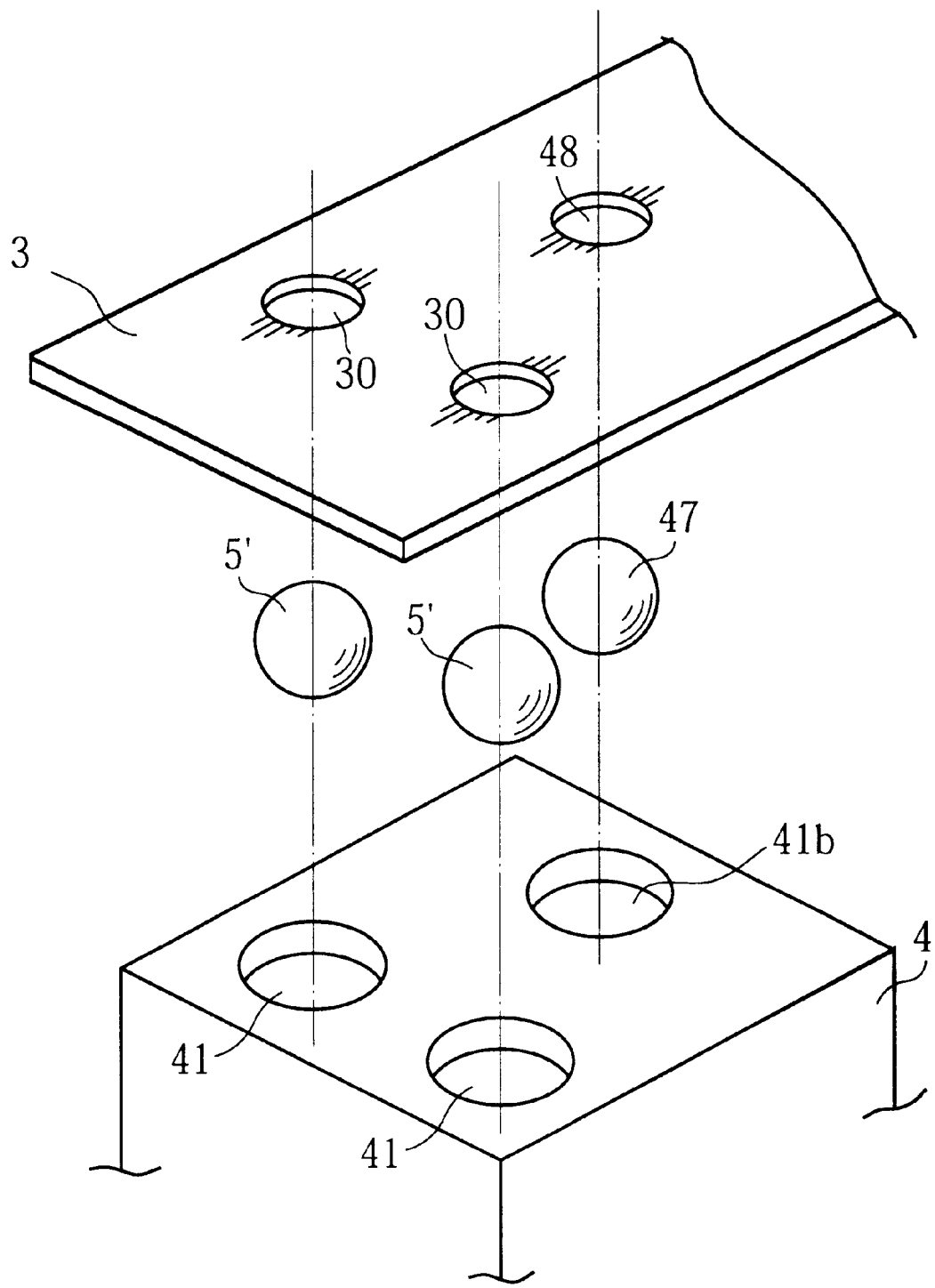
FIG. 11 illustrates another possible structure for mounting the head-supporting plate on the supporting block.

FIG. 11 shows another possible structure for supporting the plate 3 on the block 4. Specifically, one additional solid ball 47 identical to the original balls 5' is fitted in an additional recess 41b identical to the original recesses 41. In correspondence to the additional ball 47, the head-supporting plate 3 is formed with an additional hole 48 identical to the original holes 30. Since the diameter of the additional hole 48 is smaller than that of the additional ball 47, this additional ball can serve as a stopper for the plate 3 when the plate 3 is caused to pivot downward. Advantageously, these three recesses and three holes can be readily formed in the supporting block 4 and the plate 3, respectively, since they are identical.

Figure 12:
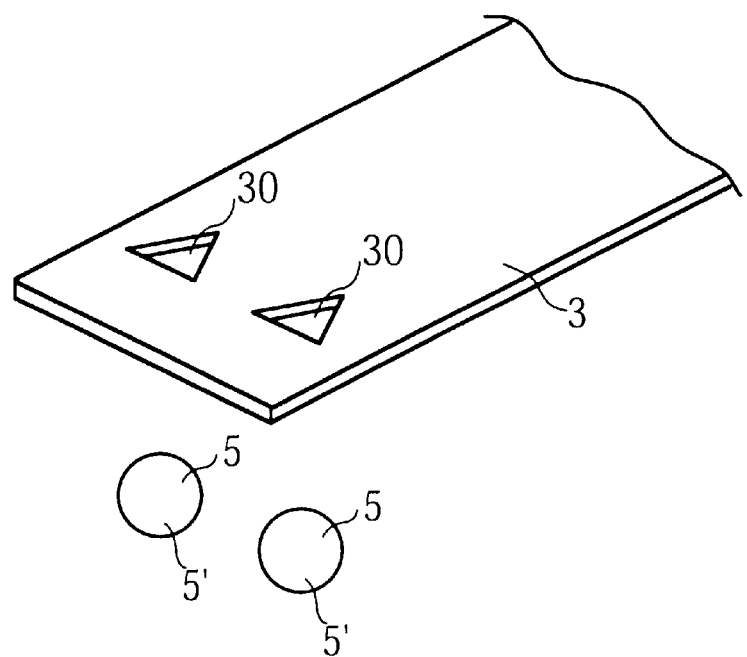
FIGS. 12–15 illustrate possible examples of protrusion and associating opening formed in the head-supporting plate.

According to the present invention, the engagement openings 30 may not necessarily have a round configuration. Specifically, as shown in FIG. 12, they may be a triangular opening. This triangle may be an equilateral or isosceles one. Since each triangular opening 30 engages with the round protrusion 5 only at three contact points (one contact point in each side of the triangle), it will cause less friction in relation to the protrusion 5. Thus, the head-supporting plate 3 can pivot smoothly on the protrusions 5, while also being stably supported by the protrusions 5.

Figure 13:
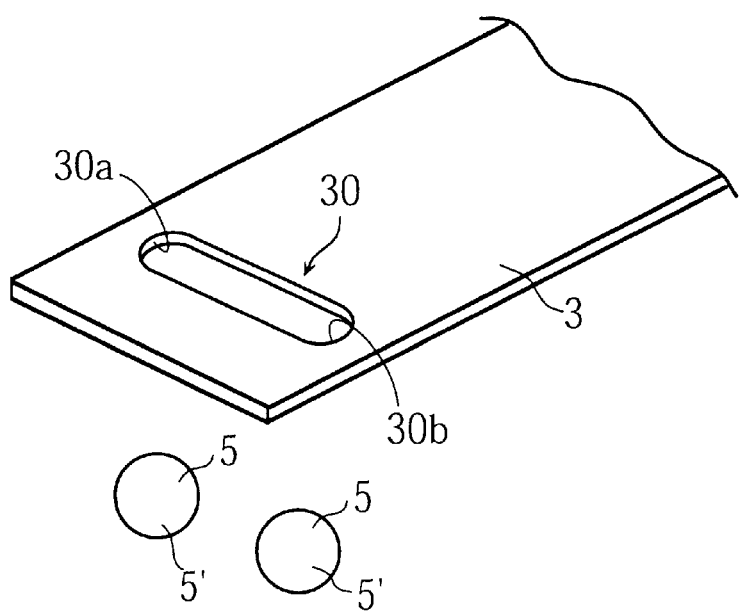

FIG. 13 shows the head-supporting plate 3 formed with a single engagement opening 30 for the two round protrusions 5. As illustrated the opening 30 is an elongated slit having two round ends 30a, 30b each of which is brought into engagement with a respective one of the protrusions 5.

Figure 14:
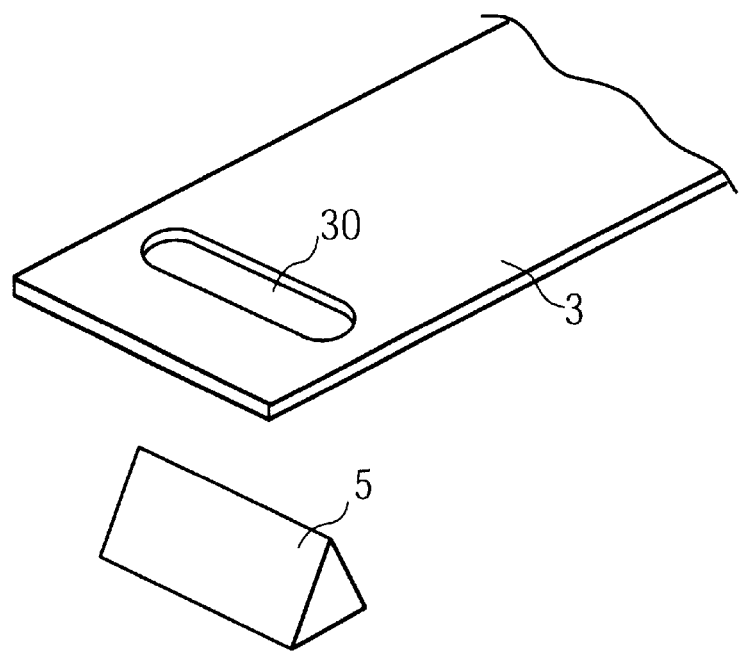

FIG. 14 shows a single protrusion 5 formed into a triangular prism which may be used in place of the two round protrusions 5 shown in FIG. 13.

Figure 15:
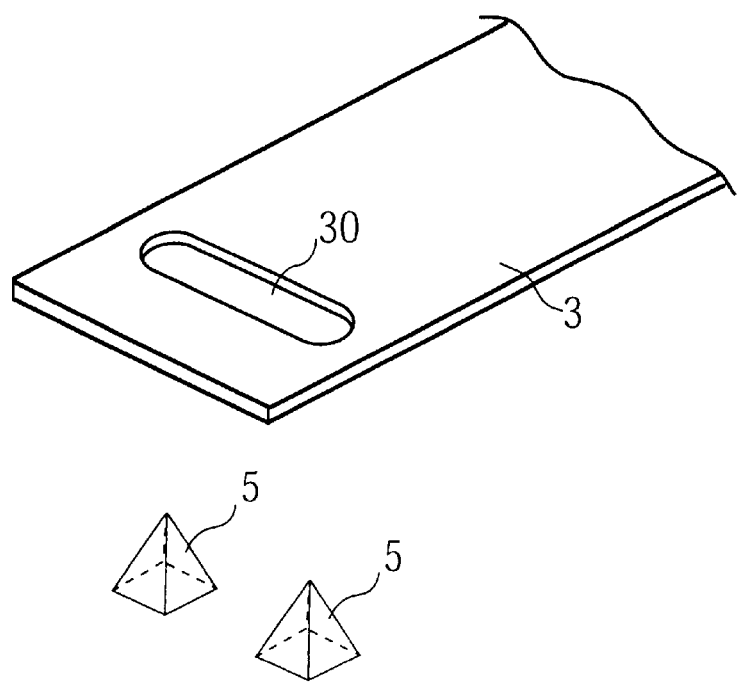

FIG. 15 shows two pyramids 5 which may be used in place of the two round protrusions 5 shown in FIG. 13.

Figure 16:
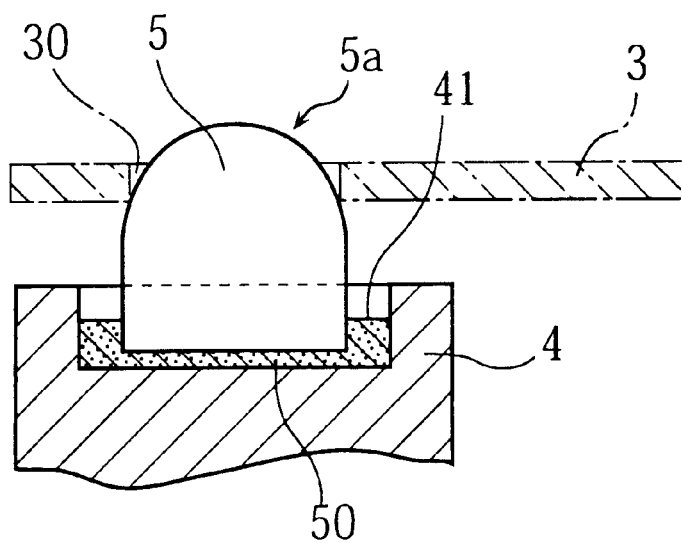
FIG. 16 shows another example of protrusion engaging with the opening of the head-supporting plate.

FIG. 16 shows a partially round protrusion 5 which may be used in place of the entirely round protrusion shown in FIG. 3 for example. Specifically, the protrusion 5 of FIG. 16 has a round upper portion 5a engaging with the hole 30 of the plate 3, while also having a cylindrical lower portion whose bottom surface 50 is flat. Due to this flat bottom surface 50, the protrusion 5 is stably placed on the supporting block 4, thereby facilitating the positioning of the protrusion 5 relative to the block 4.

Figure 17:
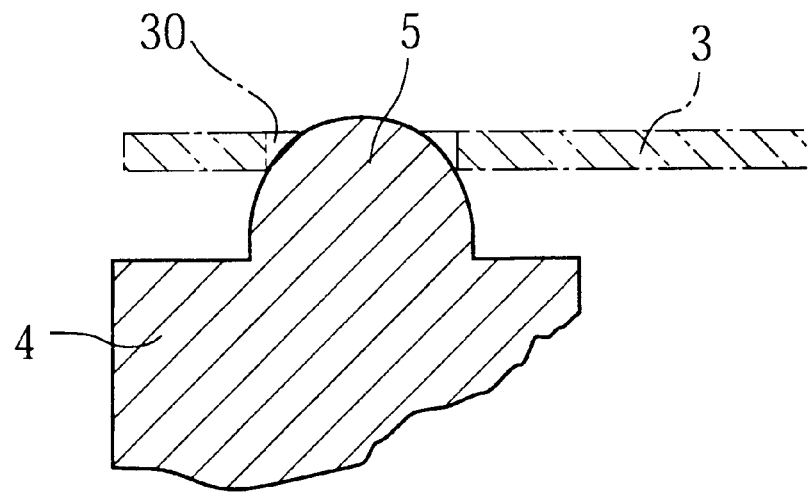
FIG. 17 is a sectional view showing another example of protrusion formed integral with the supporting block.

FIG. 17 shows a round protrusion 5 formed integral with the supporting block 4. Such one-piece design is advantageous for example to reducing the production time of the head lifting device.

Figure 18:
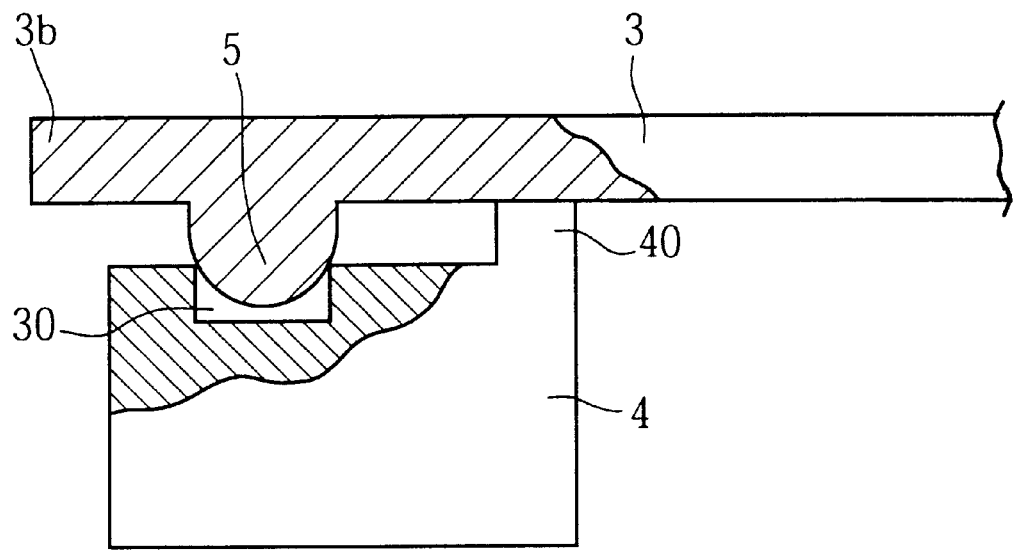
FIGS. 18 and 19 show another example of protrusion formed integral with the head-supporting plate, while also illustrating how this protrusion works in combination with the supporting block.
Figure 19:
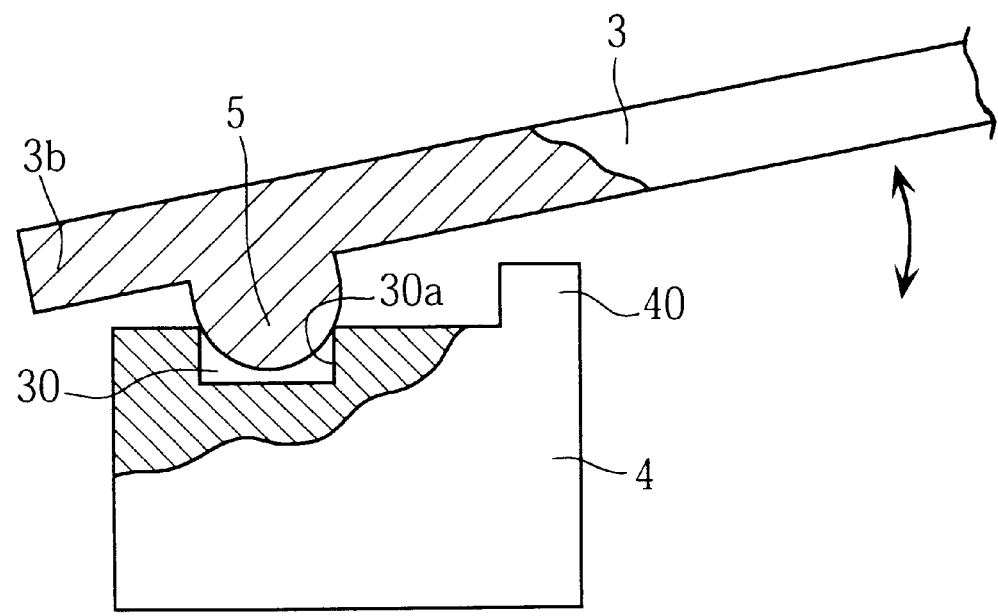

FIGS. 18 and 19 show another example of pivot structure, whereby a round protrusion 5 is formed integral with the head-supporting plate 3. The supporting block 4 is formed with a bottomed hole 30 for receiving the downward protrusion 5. According to the present invention, the hole 30 may be a bottomless hole extending throughout the thickness of the block 4. The configurations of the protrusion 5 and hole 30 may be modified in the same manner as described above with reference to FIGS. 12–16.

Figure 20:
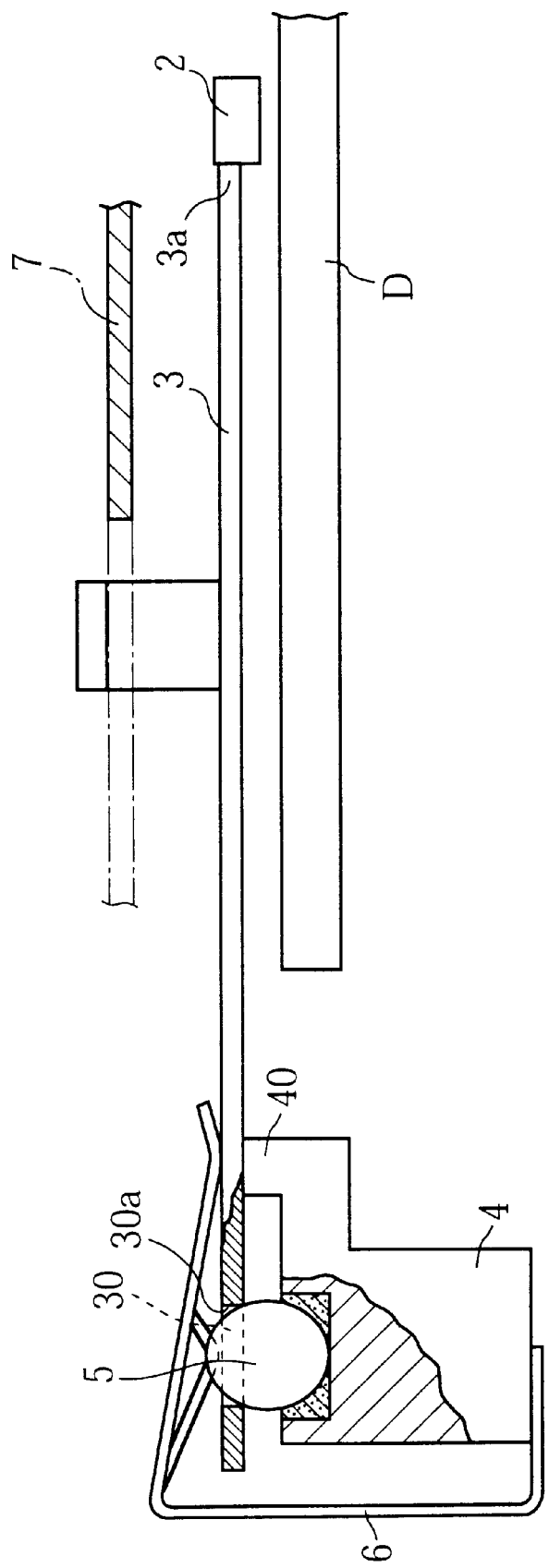
FIG. 20 is a side view showing, partially in section, another example of head lifting device embodying the present invention.

FIG. 20 shows the principal components of another head lifting device embodying the present invention. In this embodiment, no suspension member is used between the magnetic head 2 and the head-supporting plate 3, and hence the head 2 is directly attached to the inner end 3a of the plate 3. In such an instance, use may be made of an additional lifting mechanism (not shown) to vertically move the entirety of the head lifting device (consisting of the supporting block 4, the head-supporting plate 3, etc.).

Figure 21:
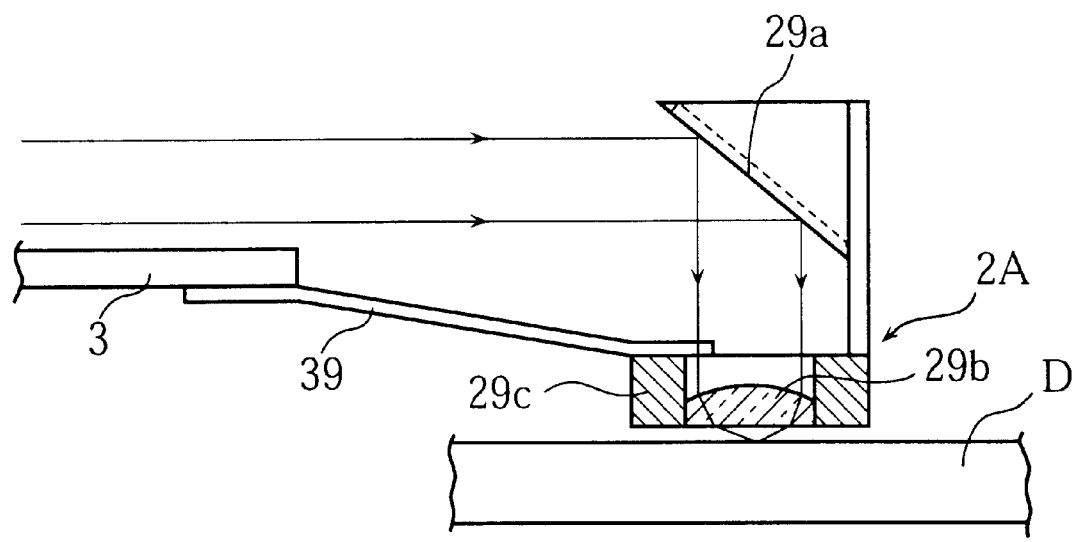
FIG. 21 shows the principal parts of an optical head to which the present invention is applicable.

As readily understood, the head lifting device of the present invention can be used not only for a magnetic head but also for an optical head. FIG. 21 shows an example of optical head to which the head lifting device of the present invention is applicable. Specifically, the illustrated optical head 2A includes an objective 29b and a lens holder 29c. The optical head 2A is supported by a movable plate 3 via a suspension 39. Above the objective 29b is provided a galvano-mirror 29a swerving to direct the laser beams emitted from a light source (not shown) toward the objective 29b.

After passing through the objective 29b, the laser beams are caused to converge on the recording layer of the disk D. In place of the galvano-mirror 29a, use may be made of an optical fiber for conducting the laser beam from the light source to the objective 29b.

The above-described optical head 2A also needs to be moved away from the disk D when the disk D is to be unloaded from the disk apparatus or reloaded into it. To this end, the head lifting device of the present invention can be used.

Figure 22:
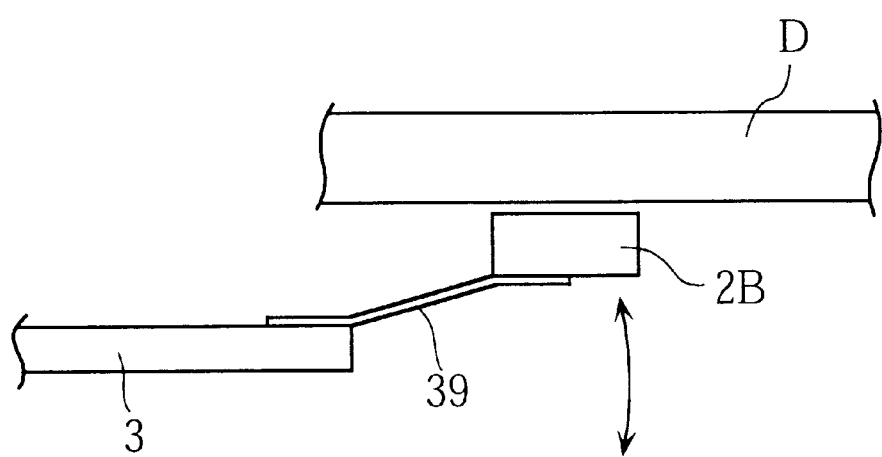
FIG. 22 is a side view showing a different arrangement for the head lifting device of the present invention, wherein a magnetic or optical head is disposed under the data storage disk.
Figure 23:
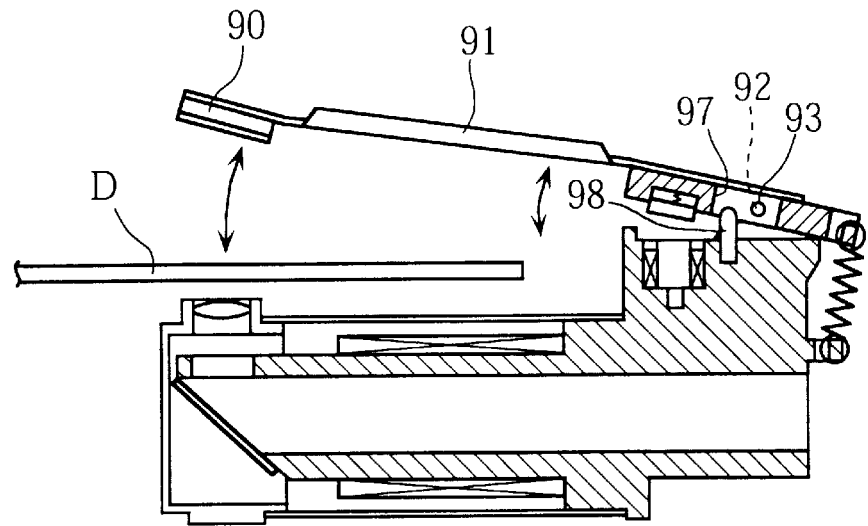
FIG. 23 is a sectional side view showing a conventional head lifting device.
Figure 24A:
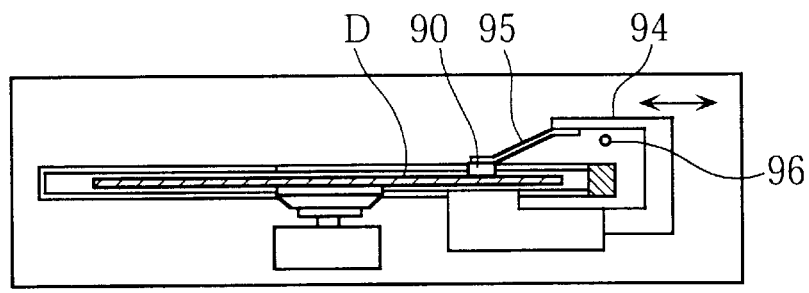
FIGS. 24A and 24B show another type of conventional head lifting device.
Figure 24B:
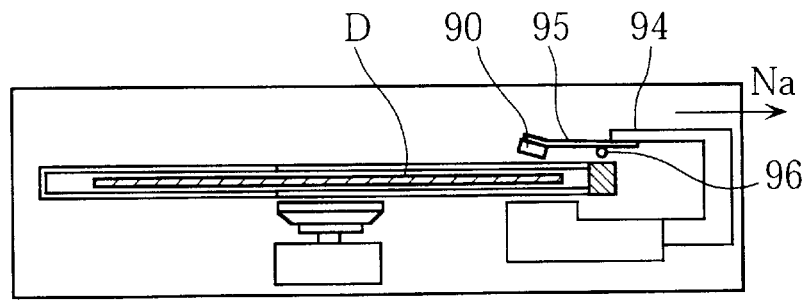

According to the present invention, as shown in FIG. 22, a magnetic head 2B may be disposed under the disk D. In this case, the head lifting device B described with reference to FIGS. 1–7 may be used for moving the head 2B toward or away from the disk D after the device B as a whole is turned upside down with other modifications made if necessary.

In summary, with the use of an advantageously simple head lifting device of the present invention, a magnetic head or optical head can be moved a great distance away from the disk D, and brought back accurately into the initially adjusted facing relation to the disk D.

The present invention being thus described, it is obvious that the same may be varied in many ways. Such variations are not to be regarded as a departure from the spirit and scope of the present invention, and all such modifications as would be obvious to those skilled in the art are intended to be included within the scope of the following claims.

What is claimed is:

1. A head lifting device comprising:
   a head-supporting member including a first end and a second end opposite to the first end;
   a head element supported by the first end of the head-supporting member in facing relation to a data storage medium;
   a base member for supporting the second end of the head-supporting member;
   first connecting means for pivotably connecting the base member to the second end of the head-supporting member; and
   a lifting member connected to the base-supporting member via second connecting means,
   wherein the first connecting means includes at least one hole and at least one protrusion held in sliding engagement with the hole, only a part of the protrusion slidably engaging in the hole for allowing the base member to pivot in such a direction as to bring the head element toward and away from the data storage medium, and
   wherein the lifting member is provided with a presser portion for pressing contact with the data storage medium, the lifting member being brought toward and away from the data storage medium for causing the presser portion to fix and release the data storage medium while bringing the head element toward and away from the data storage medium via the second connecting means and the head-supporting member.

2. The head lifting device according to claim 1, wherein the hole is formed in the head-supporting member, while the protrusion is formed on the base member.

3. The head lifting device according to claim 1, wherein the hole is formed in the base member, while the protrusion is formed on the head-supporting member.

4. The head lifting device according to claim 1, wherein the head element comprises a magnetic head or optical head.

5. The head lifting device according to claim 1, wherein the protrusion includes a spherical portion engaging with the hole.

6. The head lifting device according to claim 1, wherein the hole has a circular or triangular configuration.

7. The head lifting device according to claim 1, wherein the protrusion includes a non-spherical portion.

8. The head lifting device according to claim 7, wherein the protrusion comprises a prism or pyramid.

9. The head lifting device according to claim 1, wherein the first connecting means includes first and second protrusions spaced from each other in a direction perpendicular to a line connecting the first and the second ends of the head-supporting member, the first and the second protrusions being engaged with said one hole of the first connecting means.

10. The head lifting device according to claim 1, wherein the first connecting means includes first and second protrusions spaced from each other in a direction perpendicular to a line connecting the first and the second ends of the head-supporting member, the connecting means further including first and second holes engaging with the first and the second protrusions, respectively.

11. The head lifting device according to claim 1, wherein the hole and the protrusion are elongated in a direction perpendicular to a line connecting the first and the second ends of the head-supporting member.

12. The head lifting device according to claim 1, wherein the protrusion is formed separately from the head-supporting member and the base member.

13. The head lifting device according to claim 12, wherein the protrusion is provided with a flat surface adhered to either one of the head-supporting member and the base member.

14. The head lifting device according to claim 1, wherein the protrusion is formed integral with either one of the head-supporting member and the base member.

15. The head lifting device according to claim 1, wherein the base member is provided with a stopper to abut against a portion of the head-supporting member, said portion being located between the first end of the head-supporting member and the first connecting means.

16. The head lifting device according to claim 1, further comprising urging means to urge the head-supporting member toward the base member for keeping the hole in pressing contact with the protrusion.

17. The head lifting device according to claim 16, wherein the urging means is provided with first and second spring pieces pressing against first and second portions of the head-supporting member, respectively, the first and the second portions being spaced from each other in a direction connecting the first and the second ends of the head-supporting member.

18. The head lifting device according to claim 1, further comprising a movable lifting plate formed with an elongated opening, wherein the head-supporting member is provided with a post held in sliding engagement with the elongated opening.

19. A disk apparatus comprising:
a spindle on which a data storage disk is mounted;
a head element brought into facing relation to the disk;
a head-supporting member for supporting the head element;
a base member for supporting the head-supporting member;
first connecting means for pivotably connecting the base member to the head-supporting member; and
a lifting member connected to the base-supporting member via second connecting means,
wherein the first connecting means includes at least one hole and at least one protrusion held in sliding engagement with the hole, only a part of the protrusion slidably engaging in the hole for allowing the base member to pivot in such a direction as to bring the head element toward and away from the data storage disk, and
wherein the lifting member is provided with a presser portion for pressing contact with the data storage disk, the lifting member being brought toward and away from the data storage disk for causing the presser portion to fix and release the data storage disk while bringing the head element toward and away from the data storage disk via the second connecting means and the head-supporting member.

20. The disk apparatus according to claim 19, wherein the presser portion is designed to press the disk onto the spindle.

21. The disk apparatus according to claim 19, wherein the lifting member is provided with a slit extending radially of the disk, the second connecting means comprising a headed post for slidable engagement with the slit.

* * * * *